(12) United States Patent
Poster et al.

(10) Patent No.: US 10,334,332 B1
(45) Date of Patent: Jun. 25, 2019

(54) SYSTEM AND METHOD FOR MANAGING BATTERY LIFE IN REDUNDANT WIRELESS SENSORS

(71) Applicant: Bell Helicopter Textron Inc., Fort Worth, TX (US)

(72) Inventors: Scott David Poster, Arlington, TX (US); Brian Edward Tucker, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 16/115,894

(22) Filed: Aug. 29, 2018

(51) Int. Cl.
- *G08B 21/00* (2006.01)
- *H04Q 9/00* (2006.01)
- *B64D 45/00* (2006.01)
- *G07C 5/00* (2006.01)

(52) U.S. Cl.
CPC .............. *H04Q 9/00* (2013.01); *B64D 45/00* (2013.01); *G07C 5/008* (2013.01); *H04Q 2209/40* (2013.01); *H04Q 2209/84* (2013.01); *H04Q 2209/86* (2013.01); *H04Q 2209/883* (2013.01)

(58) Field of Classification Search
CPC ...................................................... H04Q 9/00
USPC ............ 340/946, 540, 541, 633, 635, 636.1, 340/636.11
See application file for complete search history.

(56) References Cited

U.S. PATENT DOCUMENTS

| | | | | |
|---|---|---|---|---|
| 2005/0275528 | A1* | 12/2005 | Kates | G08B 1/08 340/539.22 |
| 2012/0162828 | A1* | 6/2012 | Holsen | G06F 1/263 361/1 |

* cited by examiner

*Primary Examiner* — Tai T Nguyen
(74) *Attorney, Agent, or Firm* — Slater Matsil, LLP

(57) ABSTRACT

A method for operating a sensor system includes detecting a first wake trigger by a plurality of sensors for a component disposed in a remote location, generating, by each sensor, sensor service data that includes a battery charge level of the sensor, determining an active sensor according to the sensor service data of each sensor of the plurality of sensors, and assigning the active sensor to enter an active mode assigning each sensor of the plurality of sensors, other than the active sensor, to enter a sleep mode, generating, by the active sensor, sensor reading data for the component until an inactive trigger is detected, sending the sensor reading data using a wireless transmission to a sensor data server, and leaving the active mode by the active sensor and entering a sleep mode in response to the active sensor detecting an inactive trigger.

20 Claims, 8 Drawing Sheets

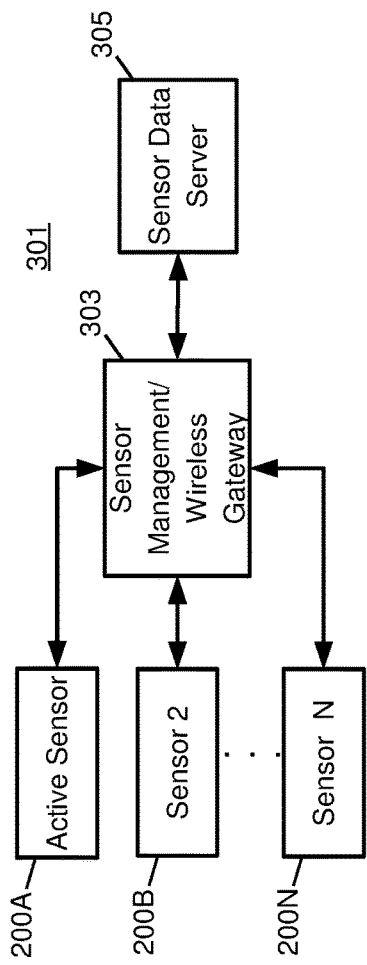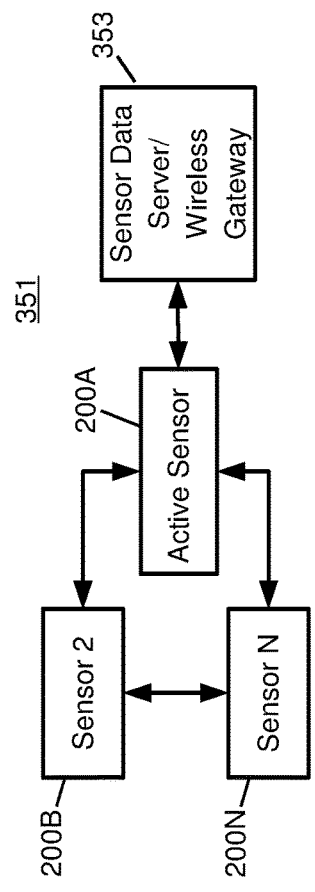
Fig. 3A
Fig. 3B

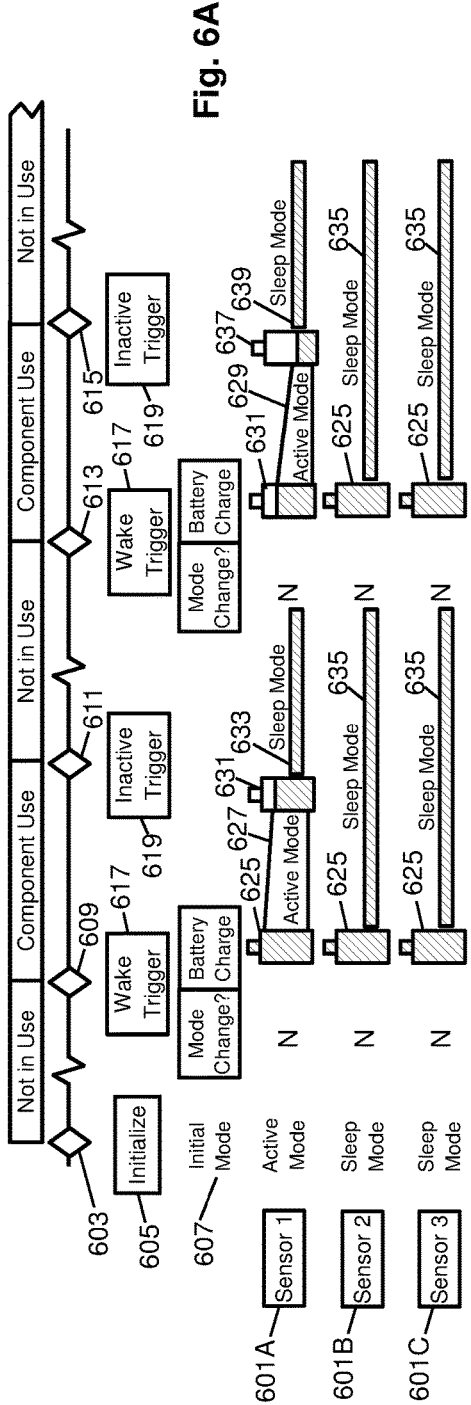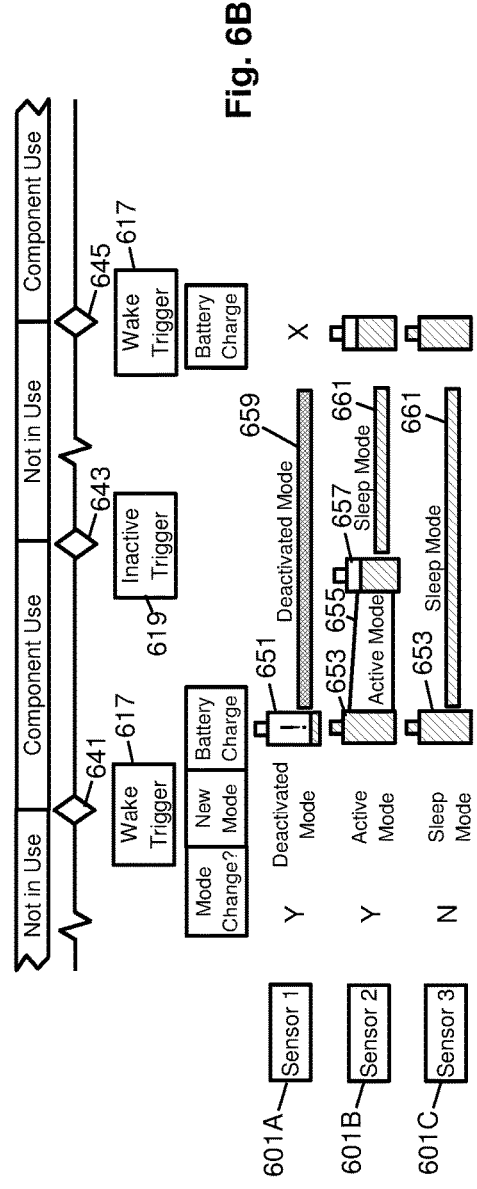

SYSTEM AND METHOD FOR MANAGING BATTERY LIFE IN REDUNDANT WIRELESS SENSORS

TECHNICAL FIELD

The present invention relates generally to wireless sensors, and, in particular embodiments, to a system and method for providing sensor coverage in a mechanical system using redundant sensors.

BACKGROUND

A rotorcraft may include one or more rotor systems including one or more main rotor systems. A main rotor system generates aerodynamic lift to support the weight of the rotorcraft in flight, and thrust to move the rotorcraft in forward flight. Another example of a rotorcraft rotor system is a tail rotor system. A tail rotor system may generate thrust in the same direction as the main rotor system's rotation to counter the torque effect created by the main rotor system. Rotorcraft include one or more engines powering the rotor systems and gearboxes are used to convert between power and torque for the engines and the rotor systems. Sensors may be disposed in one or more systems of the rotorcraft, and may provide data from real time monitoring to rotorcraft systems or to outside data collection servers for later analysis.

SUMMARY

An embodiment method for operating a sensor system includes detecting a first wake trigger by a plurality of sensors associated with a component disposed remote location, generating, by each sensor of the plurality of sensors, sensor service data that includes a battery charge level of a respective sensor of the plurality of sensors, determining an active sensor according to the sensor service data of each sensor of the plurality of sensors, and assigning the active sensor to enter an active mode assigning each sensor of the plurality of sensors, other than the active sensor, to enter a sleep mode, generating, by the active sensor, sensor reading data indicating a physical parameter of the component until an inactive trigger is detected by the active sensor, sending the sensor reading data by the active sensor using a wireless transmission to a sensor data server, and leaving the active mode by the active sensor and entering a sleep mode by the active sensor after the active sensor sends the sensor reading data and in response to the active sensor detecting an inactive trigger.

An embodiment sensor device includes a transducer, a wireless interface circuit, a battery, and a controller connected to the battery, the transducer and the wireless interface circuit. The controller is configured to detect a wake trigger, generate sensor service data, where the sensor service data includes a battery charge level of the battery, transmit the sensor service data through the wireless interface circuit, determine whether the sensor device should be an active sensor in a plurality of sensor devices according to at least the sensor service data, enter an active mode in response to determining that the sensor device should be the active sensor, enter a sleep mode in response to determines that the sensor device should not be the active sensor, generate, while the sensor device is in the active mode, sensor reading data according to a reading from the transducer and until an inactive trigger is detected by the sensor, send the sensor reading data by the active sensor using a wireless transmission to a sensor data server, and leave the active mode and entering a sleep mode in response to the active sensor detecting an inactive trigger.

An embodiment system includes a rotating component, and a sensor system having a plurality of sensors. Each sensor of the plurality of sensors is disposed on the component and monitors the component and is configured to detect a first wake trigger generating sensor service data that includes a battery charge level of a respective sensor of the plurality of sensors, determine an assigned mode for the respective sensor, where the assigned mode is assigned according to the sensor server data of each sensor of the plurality of sensors, where the assigned mode is one of at least an active mode or a sleep mode, and where at least one sensor of the plurality of sensors is determined to be an active sensor and is assigned an active mode, enter the active mode in response to the respective sensor determining that the respective sensor is the active sensor and is assigned the active mode, generate, in response to the respective sensor being the active sensor, sensor reading data indicating a physical parameter of the component until an inactive trigger is detected by the active sensor, send the sensor reading data by the active sensor using a wireless transmission, leave the active mode in response to the respective sensor being in the active mode and enter the sleep mode after the respective sensor sends the sensor reading data and in response to the respective sensor detecting the inactive trigger, and enter the sleep mode response to the respective sensor determining that the respective sensor is assigned the sleep mode.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A and 3B are logical diagrams illustrating redundant sensor systems according to some embodiments;

FIGS. 6A and 6B are logical diagrams illustrating management of sensors in a redundant sensor system according to some embodiments;

DETAILED DESCRIPTION OF ILLUSTRATIVE EMBODIMENTS

Figure 1:
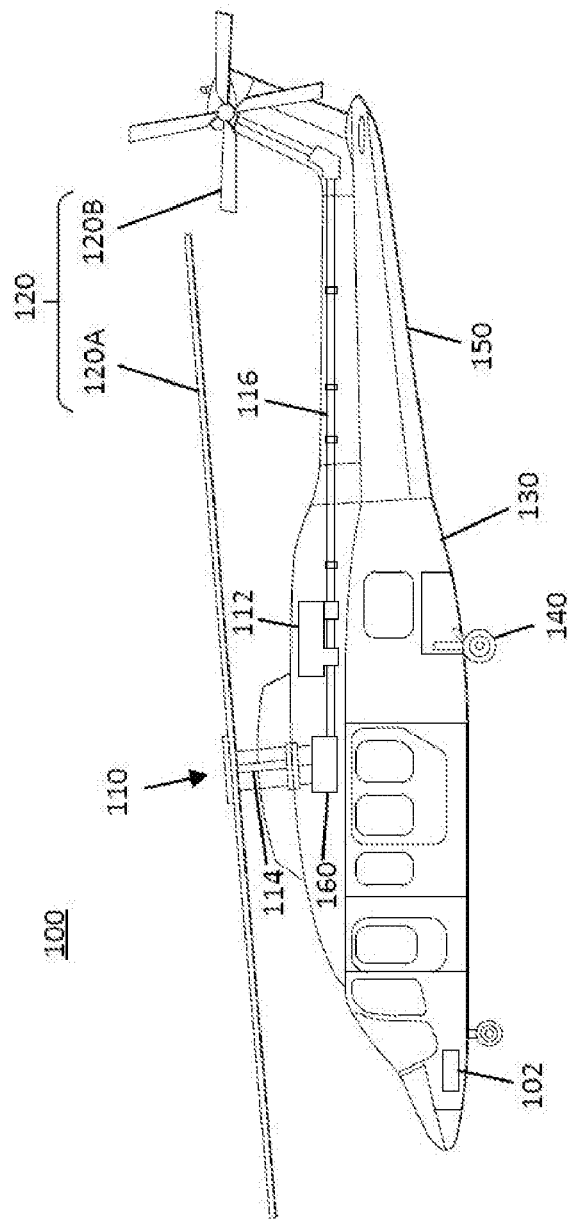
FIG. 1 illustrates certain aspects of a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing connectivity within large or complex vehicle such as rotorcraft provides the opportunity to increase the real-time monitoring capabilities of onboard systems, as well as providing ever increasing data for remote analysis. In order to increase the efficiency and ease of operation of a rotorcraft, for example, multiple sensor systems may be provided within the rotorcraft for monitoring different components, systems, flight characteristics or the like. However, many components are not situated so that traditional wired sensors are practical. For example, components that rotate cannot be provided with wired sensors since the movement of the components precludes hardwiring the sensor to a data management system. Similarly, in remote systems such as sealed subsystems, the casing surrounding the sealed system may prevent an ingress point for power or data cabling for a wired sensor, or the location of significant other elements may require significant work or cost to access or provide power to the monitored system. Instead, wireless sensors may be used on moving components, with data being transmitted via wireless channels to the data management system. However, for components in sealed or relatively inaccessible systems, a sensor's battery life or operating lifetime may be a limiting factor, and providing hardwired connections for power or data may be prohibitively expensive, or may be difficult for retrofitting existing vehicles to include a sensor system.

In accordance with some embodiments, a sensor system with multiple sensors is provided. The sensors are activated one at a time to preserve the battery life of one or more of the sensors so that the batteries of the different sensors are used sequentially. This extends the lifetime of the monitoring system, and permits the monitoring system to be customized so the number of redundant sensors may be selected to match a service lifetime of a particular component. Additionally, sensors may be removed from operation if a fault is detected in the sensor.

For example, a tailrotor gearbox for a rotorcraft may have a service interval of 2000 hours, while a main transmission of the rotorcraft may have a service interval of 1000 hours. The number of sensors for a sensor system in the tailrotor gearbox may be greater than the number of sensors for a sensor system in the main transmission so that each sensor system, overall, has a lifetime that is at least as long as the service interval of the component the sensor system monitors. Thus, each sensor may have an individual battery charge run time that is less than the service interval of the component, but the battery charge lifetime of the sensor system may extend past the service interval of the associated component since the batteries, when used in sequence, have a total batter charge run time that exceeds the service interval. Extending the useful life of a sensor system by failing over to a properly operating sensor, or to a sensor with sufficient battery power, permits a rotorcraft operator to keep the sensor system in operation for the entirety of the service interval for the relevant component, avoiding a need to perform major maintenance to replace a power source in a wireless sensor that may be in a remote location such as a sealed case or system, or relatively inaccessible system.

In some embodiments, sensors communicate with a wireless gateway that is remote from the component being monitored, and may provide battery and sensor state data to the gateway. In other embodiments, the sensors send the battery and sensor state data to other sensors in the system and the sensors may negotiate with each other regarding whether a previously active sensor is kept active, or made inactive and a different sensor made active. This information may be used to switch between sensors to ensure that the battery life of multiple sensors allows for monitoring of the component until its next maintenance. In some embodiments, the sensors may be activated in round robin fashion, by a preselected priority, randomly selected, or the like. Each sensor may be activated in turn and operated until the sensor fails or the sensor battery power falls below a predetermined threshold, after which the next sensor is activated.

Additionally, in order to further preserve battery power, the sensors may go into a sleep mode when the vehicle, system, or component is inactive, or when monitoring is not needed. More specifically, many components are not in operation continuously, so all of the sensors may enter periods of inactivity while the component is not in use. In some embodiments, the sensors may wake up from sleep mode based on a trigger such as a physical component trigger such as vibration or movement (which may be after a period of no vibration or movement) of the monitored component, or the like, or another trigger such as a wireless signal from the gateway, a timer expiring, or the like. In this embodiment, upon waking up, each sensor may share their current status (with either the gateway or with each other). At the beginning of each wake period, a re-evaluation of which sensor should be active takes place. Once this evaluation is completed, the sensors designated as not active will return to sleep mode to continue to conserve battery until the next wake trigger is received.

Figure 2:
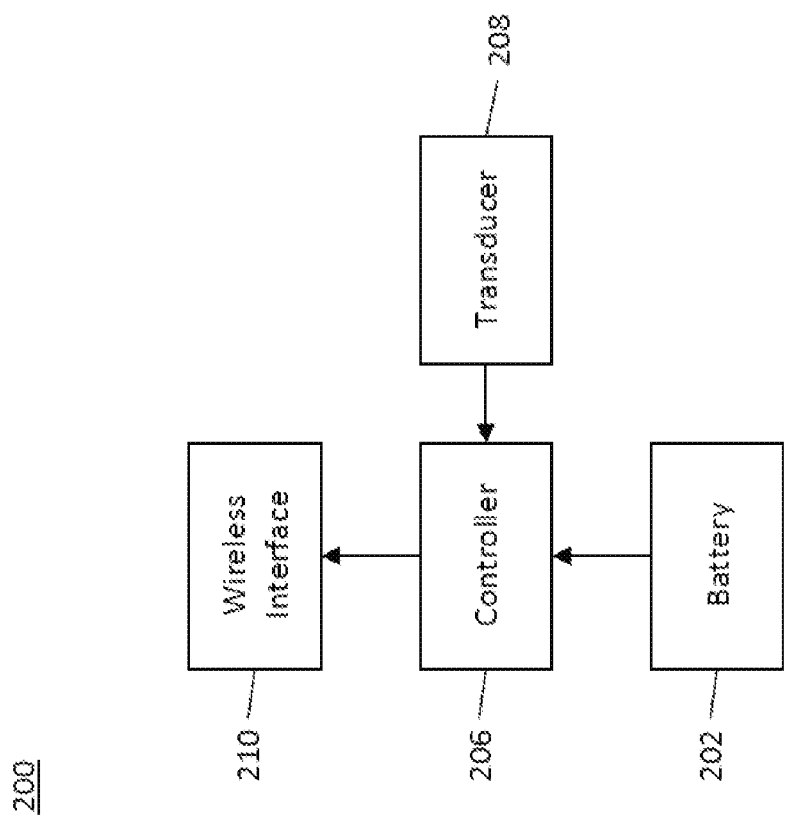
FIG. 2 is a block diagram of a sensor according to some embodiments.

FIG. 1 illustrates certain aspects of a rotorcraft 100 according to some embodiments. The rotorcraft 100 includes rotorcraft computers 102, a power train system 110, rotor blades 120, a fuselage 130, landing gear 400, and an empennage 150. The rotorcraft computers 102 may be operable to collect data about, or control flight of, the rotorcraft 100. In some embodiments, the rotorcraft 100 is a fly-by-wire rotorcraft, and in such embodiments, the rotorcraft computers 102 may be flight control computers (FCCs) operable to execute one or more control laws (CLAWS) that control flight of the rotorcraft 100. The rotorcraft computers 102 may be operable to perform sensor data collection and analysis as part of a health and usage monitoring system (HUMS), sensor system, control system, monitoring system, or the like. The rotor blades 120 include main rotor blades 120A and tail rotor blades 120B. The power train system 110 rotates the main rotor blades 120A and optionally the tail rotor blades 120B. FIG. 2 illustrates aspects of the power train system 110, in accordance with some embodiments. The power train system 110 includes one or more engines 112, a gearbox 160, a rotor mast 114, and a tail rotor drive shaft 116. The engines 112 supply torque to the rotor mast 114 via the gearbox 160, thus rotating the main rotor blades 120A. The engines 112 may also supply torque to the tail rotor drive shaft 116, thus rotating the tail rotor blades 120B. The gearbox 160 may be a main rotor transmission system. It should be appreciated that the power train system 110 may include more gearboxes or other types of gearboxes than the gearbox 160 shown. The power train system 110 may include a swashplate (not shown) for collectively or cyclically controlling the pitch of each of the main rotor blades 120A in order to selectively control direction, thrust, and lift of rotorcraft 100.

The fuselage 130 represents the body of the rotorcraft 100 and may be coupled to the power train system 110 such that the power train system 110 and rotor blades 120 move the fuselage 130 through the air during operation. The landing gear 140 supports the rotorcraft 100 when the rotorcraft 100 is grounded. The empennage 150 represents the tail section of the aircraft and is connected to the tail rotor blades 120B. The power train system 110 and tail rotor blades 120B may collectively provide thrust in the same direction as the rotation of the main rotor blades 120A, so as to counter torque effects created by the main rotor blades 120A.

It should be appreciated that teachings from the rotorcraft 100 may apply to aircraft other than rotorcraft, such as airplanes, tilt rotor aircraft, and unmanned aircraft, to name a few examples. In addition, teachings of certain embodiments relating to rotor systems described herein may apply to the power train system 110 or other power train systems, including but not limited to non-rotorcraft power train systems.

The gearbox 160 transmits power from the engines 112 to the main rotor blades 120A and tail rotor blades 120B. The gearbox 160 converts between power and torque for a power source (e.g., the engines 112) and an object to be moved (e.g., the rotor blades 120). The gearbox 160 is operable to reduce the power output by the engines 112 and increase the torque applied to the rotor blades 120.

FIG. 2 is a block diagram of a sensor 200 according to some embodiments. The sensor 200 includes a battery 202, a controller 206, a transducer 208, and a wireless interface 210. The battery 202 may be any type of embedded battery, such as a lithium-ion battery, NiMH battery, or the like.

The controller 206 is powered by the battery 202. The controller 206 receives transduced signals from a transducer 208 that measures physical parameters of a component being monitored, and transmits the signals over the wireless interface 210, e.g., to the rotorcraft computers 102. The controller 206 may be any type of controller and may have a processor such as a microprocessor, a microcontroller, an application-specific integrated circuit, a field programmable gate array, or the like. The controller may further include a non-transitory computer readable medium having a program for execution by the processor stored thereon. The program may include instructions for executing the mode assignment and sensing processes described below.

The transducer 208 may be any type of transducer that is acceptable for the desired type of sensor. When the sensor 200 is a temperature sensor, the transducer 208 may be a diode, thermistor, resistance temperature detector, thermocouple, or the like. When the sensor 200 is a vibration sensor, the transducer 208 may be an accelerometer, a gyroscope, or the like. When the sensor 200 is a debris sensor, the transducer 208 may include a moving magnet and two electrodes, which produce a transduced signal indicating the presence of metallic debris between the electrodes. Alternatively, the transducer 208 may be operable to produce a Gaussian field and detect interruptions in the Gaussian field, indicating the presence of metallic or non-metallic debris. When the sensor 200 is an oil quality sensor, the transducer 208 may be an electrochemical pH sensing element having a measuring electrode and a reference electrode, a moisture detector such as a variable resistor, combinations thereof, or the like. The wireless interface 210 may be, e.g., a RF interface, and may include an antenna for transmission to a receiving device such as the rotorcraft computers 102.

FIGS. 3A and 3B are logical diagrams illustrating redundant sensor systems according to some embodiments. In different embodiments, a sensor system may use different processes for switching the assigned modes of sensors in the system. In some embodiments, the sensors themselves may negotiate or determine which sensor is the active sensor, and in other embodiments, the sensors may communicate with a sensor management element or wireless gateway that manages which sensor is active.

FIG. 3A is a logical diagram illustrating a sensor system 301 with a sensor management element 303 or wireless gateway. In some embodiments, a sensor management element 303 monitors the operation of the sensors 200A . . . 200N and arbitrates which sensors 200A . . . 200N are assigned various operating modes. The sensor management element 303 may include a processor and non-transitory computer readable medium storing a program having instructions to manage the sensors and assign sensor modes to each of the sensors as described below.

The sensor management element 303 may have an integrated wireless gateway and includes a processor and non-transitory computer readable medium with a program for managing the sensors 200A . . . 200N stored thereon. The sensor system 301 includes a plurality of sensors 200A . . . 200N, and in some embodiments, one or more of the sensors 200A . . . 200N is assigned to have an active mode, while the other sensors are non-active or inactive sensors, and may be assigned a sleep mode or non-active mode. In some embodiments, the system also has a sensor data server 305 that stores sensor data from the active sensor 200A. The sensors 200A . . . 200N may communicate wirelessly with the sensor management element 303 for monitoring and mode assignment. The sensors 200A . . . 200N may also communicate wirelessly with the sensor data server 305, either directly, through the sensor management element 303, or through another system, to report sensor reading data. In some embodiments, the sensor data server 305 is a flight computer such as an FCC that handles real-time flight control or a HUMS, or may be a device that is located outside of the vehicle, and that uses the sensor reading data for maintenance tracking, system analysis, fleet management, or the like.

The sensors 200A . . . 200N may send sensor service data such as configuration information, sensor identification data, power data, sensor state data, environmental data, operational data, and the like, to the sensor management element 303. The sensor management element 303 may use the sensor service data to determine which sensor 200A . . . 200N should be the active sensor 200A. The configuration information may include sensor type, installation location describing the system the sensor belongs to or the component being monitored by, or associated with, the sensor. The sensor identification data may include a sensor serial number, assigned identification number, assigned mode or sensor state identifier, group or system identification information, or the like. The power data may include information indicating a state of a battery charge, historical or current power consumption rate, anticipated power consumption rate, or the like. The sensor state data may include a previous or current operating mode, current operating condition or failure of the sensor or sensor subsystems, or the like. In some embodiments, the current operating condition data includes failure reporting information regarding sensor values being out of range, detection of open circuit or short circuits in sensor circuitry or wiring, reports on data quality, or the like. The environmental data may include location or movement data, information regarding the region immediately external to the sensor, or the like. The operational data may include saved data, sensor readings, data related to previous or current operations of the sensor, or the like.

The sensor management element 303 receives the service data from each sensor 200A ... 200N, determines which mode each sensor 200A ... 200N should be in, including which sensor 200A ... 200N is active, and wirelessly notifies each sensor 200A ... 200N of the state the respective sensor 200A ... 200N will operate in through a mode assignment message such as a communication, signal or the like. In some embodiments, the sensor management element 303 determines whether a server that was most recently active reports service data, and determines whether the active sensor 200A or most recently active sensor 200A is in condition to remain active. In some embodiments, the active sensor 200A may report that it was previously active, and the remaining sensors 200B ... 200N may report that they were previously in sleep mode or inactive mode, disabled, nonfunctional, or the like. The sensor management element 303 determines whether the active sensor 200A is within normal operating limits, and maintains the active state of the active sensor if the active sensor 200A is within normal operating limits. In some embodiments, the operating limits may include the active sensor 200A having sufficient battery charge to perform sensing, being in the correct environment, being fully functional and operating properly, or the like.

If the sensor management element 303 determines that the active sensor 200A should no longer be active in response to the active sensor not being within normal operating limits, or if the active sensor 200A fails to report sensor service data within a predetermined time, the sensor management element may assign a new active sensor according to one or more rules. For example, if one or more of the non-active sensors 200B ... 200N wake up and report sensor service data, and the active sensors 200A fails to report its sensor service data within a predetermined time period after one or more of the non-active sensors 200B ... 200N report, the sensor management element 303 may determine that the active sensor 200A is disabled or inoperable. The sensor management element 303 may then determine whether the other non-active sensors 200B ... 200N are within normal operating limits, and assign one of the other non-active sensors 200B ... 200N to be the active sensor 200A. The sensor management element 303 may send a message to assign one of the sensors 200A ... 200N to be the active sensor 200A, and may, in some embodiments, send a message to the previously active sensor 200A to enter a deactivated mode, or send a message to one or more of the sensors 200A ... 2000N to remain in, or enter, an inactive mode.

FIG. 3B is a logical diagram illustrating a sensor system 351 with a sensor data server 353 or wireless gateway. The system 351 includes a plurality of sensors 200A ... 200N, and in some embodiments, one or more of the sensors 200A ... 200N is assigned to have an active mode. In some embodiments, the sensors 200A ... 200N communicate with each other and arbitrate which sensors 200A ... 200N are assigned various operating modes. The active sensor 200A may communicate wirelessly with the sensor data server 353 through a wireless gateway to report sensor reading data to the sensor data server 353. In some embodiments, the sensor data server 353 is a flight computer such as an FCC that handles real-time flight control or a HUMS, or may be a device that is located outside of the vehicle, and that uses the sensor reading data for maintenance tracking, system analysis, fleet management, or the like.

The sensors 200A ... 200N may have a processor and non-transitory computer readable medium storing instructions causing the processor for the sensor 200A ... 200N to receives data from the other sensors 200A ... 200N and arbitrate which of the sensors 200A ... 200N becomes the active sensor 200A by applying one or more rules.

For example, one rule may be that a sensor 200A ... 200N that is the active sensor 200A remains in active mode if the reported sensor service data indicates that the active sensor 200A has sufficient battery charge and is operating within normal operating limits. Another rule may be that a new active sensor is selected when none of the sensors 200A ... 200N are determined to be the active sensor 200A, the active sensor 200A fails to report sensor service data within the predetermined time, or the active sensor 200A has insufficient battery charge or is not operating within normal operating limits. Yet another rule may be that an active sensor 200A is selected from the available sensors according to the reported sensor service data. In some embodiments, the rules may be that the active sensor 200A is selected according to selection criteria that may be battery charge state, serial number, a priority value, a randomly generated number, or the like.

The sensors 200A ... 200N may wake up and send sensor service data to each of the other sensors 200A ... 200N in the system 351. Each sensor 200A ... 200N may verify that the sensor service data being received is from a sensor 200A ... 200N in the system 351, and not sensor service data from another system by verifying that information in the sensor service data, such as sensor identification data, configuration data, or the like, identify that the received data is from a sensor in the system 351, a preselected sensor group, is of a predetermined sensor type, or the like. Each sensor 200A ... 200N may wait for sensor service data for a predetermined period of time, and use the sensor service data generated by the respective sensor 200A ... 200N, as well as sensor service data received from the other sensors 200A ... 200N to determine the mode for the respective sensor 200A ... 200N. Each sensor 200A ... 200N evaluates sensor service data from the other sensors 200A ... 200N using one or more of the rules to arbitrate which sensors change mode.

For example, when the rules are applied by the sensors 200A ... 200N a second sensor 200B may determine that it should enter an active mode when the second sensor determines that a previously active sensor has insufficient battery charge, and further when the second sensor determines that it has a serial number lower than other previously inactive sensors 200N. The second sensor 200B may also maintain a sleep mode or inactive mode if the second sensor determines that a previously active sensor 200A has sufficient battery charge and is operating within normal operating limits, or if the second sensor determines that it has a serial number that is not lower than other previously inactive sensors 200N. In this situation, the second sensor 200B may assume that the other previously inactive sensor 200N will take over as the active mode. However, in other embodiments, one or more of the sensors 200A . . . 200N may communicate with the other sensors 200A . . . 20N to confirm that another sensor has become the active sensor 200A.

Figure 4:
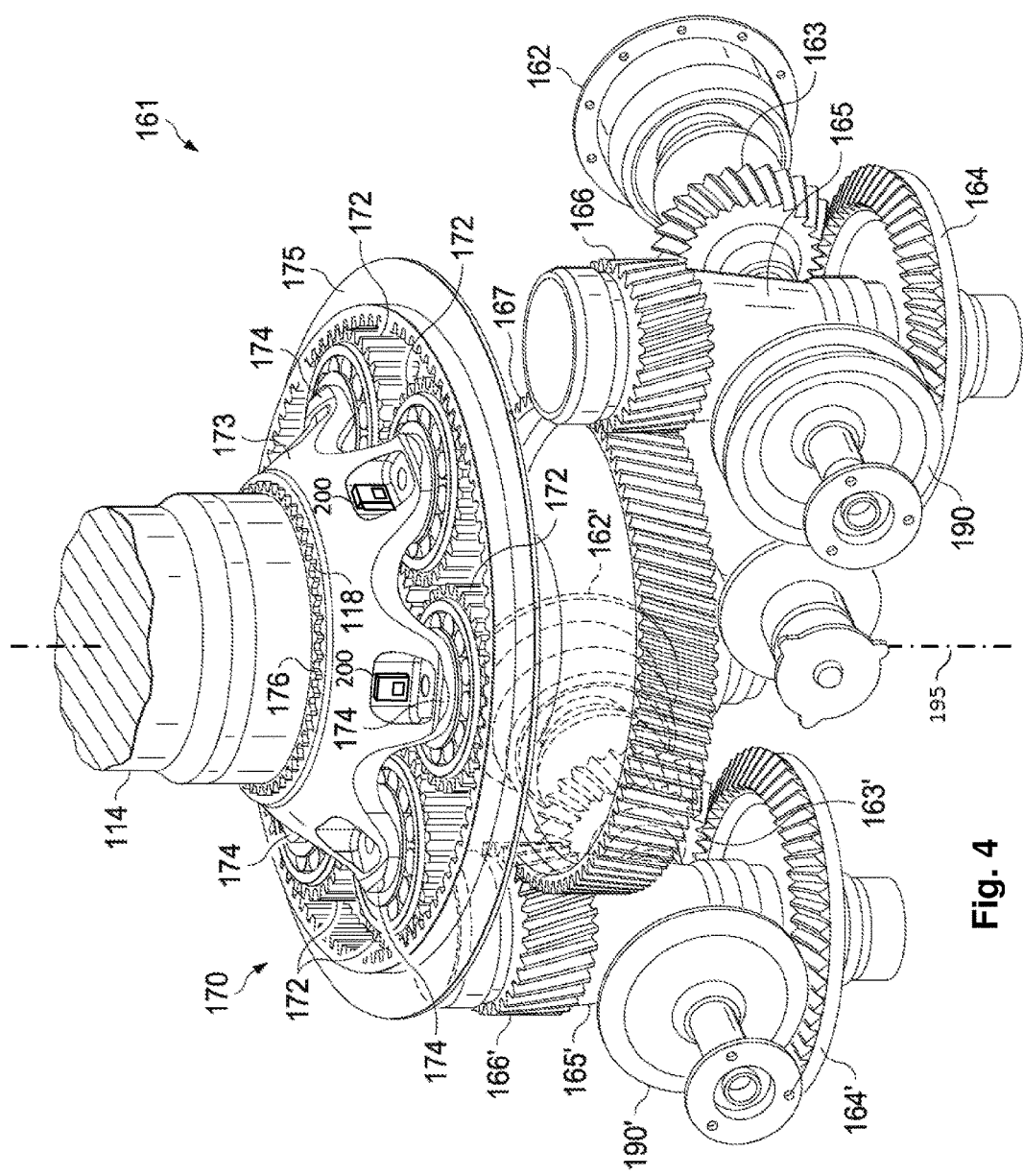
FIG. 4 is a diagram illustrating a gear train 161 of a gearbox or transmission having sensors 200 according to some embodiments.

FIG. 4 is a diagram illustrating a gear train 161 of a gearbox or transmission having sensors 200 according to some embodiments. The gear train 161 includes a planetary gear set 170 and associated gears for transferring power from one or more engines to an output such as wheels, rotors, fan blades, generators, or other mechanical system. While the illustrated gear train 161 shown is from a rotorcraft, the disclosed principles may be applied to ground vehicles, machinery, fixed wing aircraft, ships power systems, or the like. The gear train 161 is contained within a gearbox housing (not shown). The gearbox housing may be sealed to contain transmission fluid, hydraulic fluid, oil or another lubricant for lubricating the gear train 161. One or more sensors 200 may be disposed on parts of the gear train, and multiple sensor systems, each having multiple sensors 200, may disposed on a gear train 161, with different sensor systems disposed on, and monitoring, different components.

The gear train 161 includes an input pinion 162. The input pinion 162 is in mechanical communication with, and receives rotational energy from, the engines 112. The input pinion 162 includes a helical bevel gear portion 163. The helical bevel gear portion 163 of the input pinion 162 meshes with, and transmits rotational energy to, a bevel gear 164. The bevel gear 164 may be, e.g., a helical bevel gear. The bevel gear 164 meshes with and drives an accessory drive gear 190, which may be used to provide rotational energy to an accessory gearbox (not shown) and/or various aircraft accessories (not shown). In embodiments where the gearbox 160 is a gearbox for the main rotor blades 120A, the accessory gearbox may be a gearbox for the tail rotor blades 120B. The aircraft accessories may include air blowers, cooling fans, lubrication pumps, hydraulic pumps, electrical generators, and/or the like. The bevel gear 164 is also attached to a helical spur gear 166 via a common shaft 165. Thus, the bevel gear 164, common shaft 165, and helical spur gear 166 rotate together about a common axis. Torque applied to the bevel gear 164 is transmitted via the common shaft 165 to the helical spur gear 166. The helical spur gear 166 meshes with, and transmits rotational energy to, a bull gear 167. The bull gear 167 is integral with a sun gear 171 of the planetary gear set 170. Thus, torque applied to the bull gear 167 is transmitted to the sun gear 171.

The power train system 110 may include more than one of the engines 112, such as two engines 112, which may increase redundancy of the power train system 110. In such embodiments, the gear train 161 further includes a second input pinion 162', a second helical bevel gear portion 163', a second bevel gear 164', a second common shaft 165', a second helical spur gear 166', and a second accessory drive gear 190', each of which may be similar to its previously-described counterpart. Descriptions will not be repeated herein. Rotational energy provided at either or both of the input pinions 162 and 162' is ultimately combined at the bull gear 167 and transmitted to sun gear 171.

In the planetary gear set 170, the sun gear 171 is a straight-cut spur gear that meshes with, and transmits rotational energy to, a plurality of planet gears 172. The planet gears 172 are rotatably mounted to a planetary carrier 173. The planetary gear set 170 may have any number of planet gears 172, and in the illustrated embodiment, has six planet gears 172. The planetary carrier 173 includes a plurality of posts 174, each of which is configured to receive one of the plurality of planet gears 172. Each of the posts 174, therefore, defines the rotational axis for a corresponding planet gear 172 rotatably mounted thereon. The planetary carrier 173 is an overhung planetary carrier, having a plurality of downwardly-extending, cantilevered posts 174. It should be appreciated that the components of the planetary gear set 170 (e.g., the planetary carrier 173) may have other configurations and orientations. For instance, in some embodiments, the planetary carrier 173 may instead include a lower plate, an upper web, and planetary posts extending between the lower plate and upper web.

Each of the planet gears 172 meshes with a ring gear 175. The ring gear 175 is stationary. For example, the ring gear 175 may be fixedly mounted in or on the gearbox housing 180, and does rotate with respect to the gearbox housing 180. The planetary carrier 173 establishes spatial relationships among the sun gear 171, planet gears 172, and ring gear 175. In particular, each of the planet gears 172 meshes with both the sun gear 171 and the ring gear 175. Because the sun gear 171 rotates while the ring gear 175 is fixed, the planet gears 172 travel on an orbiting path about the sun gear 171 as they rotate on the posts 174. The orbiting action causes the planetary carrier 173 to rotate.

The planetary carrier 173 includes internal splines 176. The internal splines 176 mesh with mating external splines 118 on the rotor mast 114. Thus, the planetary carrier 173 serves as the main output for the gearbox 160, and transmits rotational energy to the rotor mast 114. The bull gear 167, sun gear 171, planetary carrier 173, and rotor mast 114 are all operable to rotate about a substantially common axis of rotation 195.

Sensors 200 are disposed on the components of the gear train 161. Notably, the sensors 200 may be disposed on either fixed features or moving features of the gear train 161. An example of a fixed feature may be the gearbox housing. An example of a moving feature may be the planetary gear set 170 and its components. In the illustrated embodiment, the sensors 200 are disposed on sidewalls of the planetary carrier 173, adjacent to portions of the planetary carrier 173 that are connected to the posts 174. It should be appreciated that the sensors 200 may be disposed on other moving features, such as any components of the planetary gear set 170. For example, the sensors 200 may be disposed on a major surface of the bull gear 167, a major surface of the sun gear 171, other surfaces of the planetary carrier 173, or the like. Further, the sensors 200 may be disposed on a combination of fixed and moving features. The sensors 200 may be sealed devices that are capable of operating in a fluid, such as in oil of the gearbox 160.

The gearbox 160 converts a large amount of power to torque. In some embodiments, the engines 112 provide as much as 2500 horsepower to the gearbox 160. As such, moving features of the gearbox may fail sooner than fixed features of the gearbox. Because the sensors 200 are attached to the moving features of the gear train 161, they may be more capable of detecting problems with the moving features than sensors attached on the fixed features of the gearbox such as the gearbox housing). In particular, the sensors 200 may be able to directly measure certain operating conditions of the moving features, while sensors attached to the gearbox housing 180 may only be able to indirectly measure those operating conditions, e.g., through the use of signal processing.

The sensors 200 may be any type of sensors, such as vibration sensors, temperature sensors, debris sensors, oil quality sensors, or the like. In embodiments where the sensors 200 are vibration sensors, they may be operable to measure physical parameters such as vibration levels of the components of the gear train 161 or the overall gearbox. Vibrations levels in excess of a threshold may indicate a failure condition of monitored components, particularly for moving features. In embodiments where the sensors 200 are temperature sensors, they may be operable to measure physical parameters including ambient temperatures, such as oil temperatures. Temperatures in excess of a threshold may also indicate a failure condition. In embodiments where the sensors 200 are debris sensors, they may detect impurities in the ambient environment around the gear train 161. The presence of debris may also indicate a failure condition, such as premature wear on a component, breakage of a component or gear tooth, or the like. In embodiments where the sensors 200 are oil quality sensors, they may be operable to measure physical parameters or characteristics of the gearbox oil, such as the amount of water in the oil, the acidity of the oil, the amount of air or foam in the oil, or the like. Oil characteristics in excess of a threshold may also indicate a failure condition.

The sensors 200 attached to the moving features of the gear train 161 move during operation, and in some embodiments, are wireless, battery-powered sensors that have no connecting wires for power or data transmission. Conversely, the sensors 200 attached to the fixed features of the gearbox 160 may have connecting wires, or may be wireless to avoid requiring ingress points for physical data or power wiring. The sensors 200 are operable to communicate with, e.g., the rotorcraft computers 102 of the rotorcraft 100, with a wireless gateway on the rotorcraft, with a remote data collections server, or the like. Transduced signals from the sensors 200 may be used by CLAWS to control flight of the rotorcraft 100, or may be used by HUMS to collect and analyze health and/or usage data for the rotorcraft 100, or by an onboard or remote system for maintenance or failure monitoring.

The gear train 161 may be regularly services as part of regular aircraft maintenance. Rebuilding the gear train 161 is a costly maintenance procedure. When the sensors 200 are battery-powered, the battery life of the individual sensors 200 may be shorter than the typical time between rebuilds of the gear train 161. In particular, the sensors 200 may be used during each flight of the rotorcraft 100, and so the batteries of the sensors 200 may discharge before the gearbox 160 is scheduled for rebuild. Because rebuilding the gearbox 160 is a costly maintenance procedure, disassembling the gearbox 160 to charge the batteries of the sensors 200 may be undesirable. Thus, multiple sensors may be disposed in the same components, so that failures of a particular sensor 200 or discharge of a battery powering a sensor 200 may be detected, and a new, working sensor 200 activated to provide continuous monitoring for a time longer than the battery life of an individual sensor 200.

Figure 5:
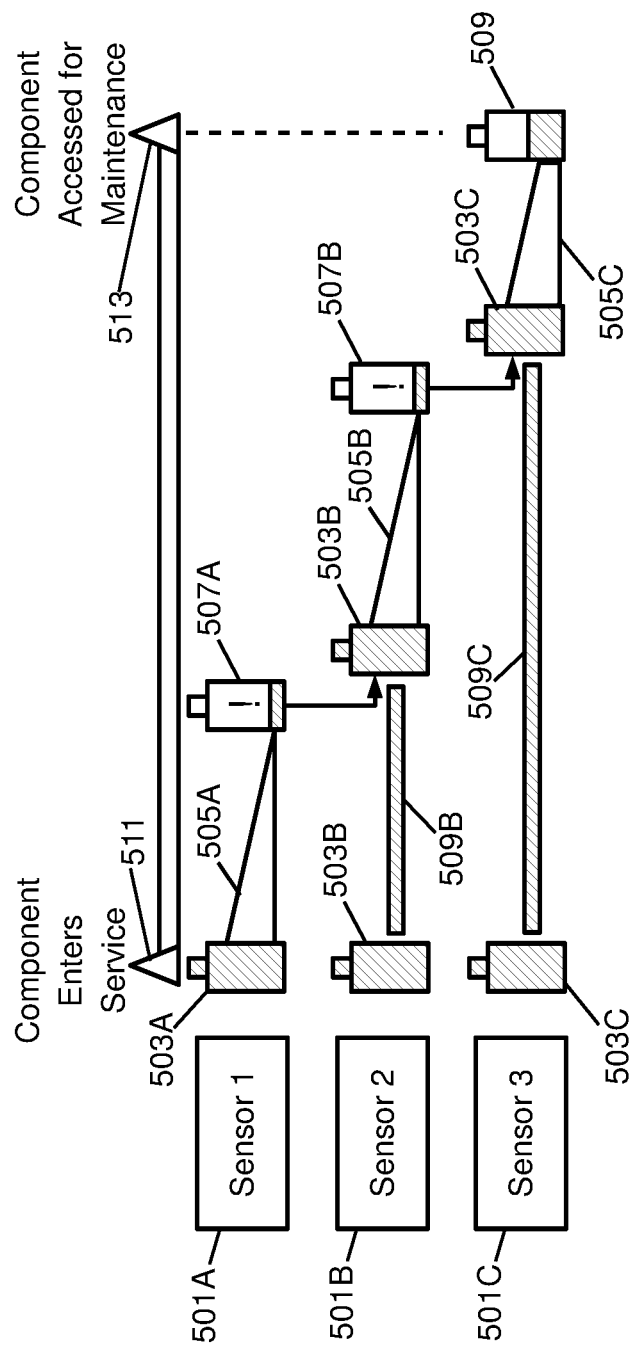
FIG. 5 is a logical diagram illustrating operation of a redundant sensor system according to some embodiments.

FIG. 5 is a logical diagram illustrating operation of a redundant sensor system according to some embodiments. The system switches between sensors as each sensor depletes its battery charge or becomes nonfunctional. Thus, the system has sensor coverage from a time a component enters service 511 until a time where the component is accessed for maintenance 513. Sensor 1 501A is active, or in an active mode 505A, and sensor 2 501B and sensor 3 501C are inactive, or in an inactive mode 509B, 509C, immediately after installation. The sensors 501A . . . 501C are installed with batteries at full charge 503A . . . 503C. The initial operating modes continue until the active sensor, sensor 1 501A, has a battery charge 507A that falls below a threshold. When sensor 1 501A becomes deactivated, sensor 2 501B switches to active mode 505B and operates until the battery charge 507B falls below a threshold. When sensor 2 503B becomes deactivated, sensor 3 501C switches to an active mode 505C and operates until the component is accessed removed for maintenance. The number of sensors 5010A . . . 503C may be selected so that battery life of the sensors 501A . . . 501C extends from the time the component enters service 511 until the time where the component is accessed for maintenance 513. In the described example, the last sensor, sensor 3 501C, has a usable battery life 509 at the time where the component is accessed for maintenance 513.

FIGS. 6A and 6B are logical diagrams illustrating management of sensors in a redundant sensor system according to some embodiments. In some embodiments, a component may be in continuous operation, for example, on a rotorcraft or aircraft, or in an industrial machine. During the periods where a component is not in use, all sensors may enter periods of inactivity. This may be referred to as a sleep mode, and may be used to conserve battery during these periods of inactivity. In sleep mode, components may monitor for wake triggers, but may, for example, power down certain subsystems such as communications, processors, transducers, or the like to converse power.

FIG. 6A is a logical diagram illustrating operation of a sensor system with sensors 601A . . . 601C reactive to wake triggers 617. Initially, at a first time point 603, the system may initialize 605 the sensors 601A . . . 601C by setting an initial mode. The initialization may be set during installation of the sensors 601A . . . 6001C, for example, by setting the mode of the sensors 601A . . . 601C manually, by the sensors 601A . . . 601C receiving initialization messages from a sensor management element, or by the sensors 601A . . . 601C communicating with each other to set the initial mode 607.

The component associated with the sensors 601A . . . 601C may remain out of use, and when the component is used at a second time point 609, the sensors 601A . . . 601C may detect a wake trigger 617. In some embodiments, the wake trigger 617 may be a vibration or movement (which may be after a period of no vibration), a wireless signal from the sensor management element, a timer expiring, or the like. Upon waking up, each sensor 601A . . . 601C shares their current status (with either the gateway or with each other). Initially, one sensor is assigned an active mode, while other sensors are held in reserve in sleep mode 635. At each wake trigger, the system evaluates which sensor 601A . . . 601C should be active, and determines whether a mode change is necessary for any of the sensors 601A . . . 601C. The sensors 601B . . . 601C designated as not active will return to sleep mode 635 to conserve battery charge 625 until the next wake trigger 617 is received. The active sensor 601A enters an active mode 627 until an inactive trigger 619 is detected at a third time point 611. The inactive trigger 619 may be a period of inactivity, lack of motion, lack of vibration, a wireless signal from the sensor management element, the expiration of a timer, or the like.

Upon detecting the inactive trigger 619, the active sensor 601A may enter a sleep mode 633, preserving the remaining battery charge 631 while the component is not in use until the next wake trigger 617. When the component is used a subsequent time, the sensors 601A . . . 601C detects the next wake trigger 617 at a fourth time point 613 and reevaluates which sensor 601A . . . 601C should be active. The system again determines whether a mode change is needed for any of the sensors, and the active sensor 60A is put into an active mode 629, while the inactive sensors 601B . . . 601C return to sleep mode 635. The active sensor remains in active mode 629 until another inactive trigger 619 is detected at a fifth time point 615, and then the active sensor 601A enters sleep mode 639 again to preserve the remaining battery charge 637.

This cycling of the sensors 601A . . . 601C to evaluate the state of the sensors 601A . . . 601C at the beginning of each component use period may continue until the component is accessed or maintenance, with the system designating a new active sensor when a current active sensor is determined to have failed, or when the current active sensor is determined to lack sufficient battery charge to perform monitoring.

FIG. 6B is a logical diagram illustrating sensor switching by a sensor system with sensors 601A . . . 601C reactive to wake triggers 617. In this example, at a sixth time point 641, a wake trigger 617 is detected. The system determines that sensor 1 601A has a battery with a low battery charge 651, and that sensor 2 601B and sensor 3 601C each have a battery in a fully charged state 653. The system may determine that a new active sensor is required due to the low battery charge 651 of sensor 1 601A, and that a mode change for sensor 1 601A is needed. The system may assign sensor 1 601A to enter a deactivated mode 659, and may select sensor 2 601B as the new active sensor based on the rules that arbitrate which sensors change mode. Sensor 2 601B may then be assigned to enter an active mode 655. The system may further determine that sensor 3 601C will maintain the same mode, and cause sensor 3 601C to enter sleep mode 661. When an inactive trigger 619 is detected at a seventh time point 643, sensor 2 601B may enter a sleep mode 661 to preserve the remaining battery charge 657, while sensor 1 601A remains in the deactivated mode.

When a wake trigger 617 is detected at an eighth time point 645 due to the component entering use, the system may repeat the sensor state evaluation for the remaining sensors 601B . . . 601C that are not deactivated to determine whether a mode change is needed for the remaining sensors 601B . . . 601C.

Figure 7:
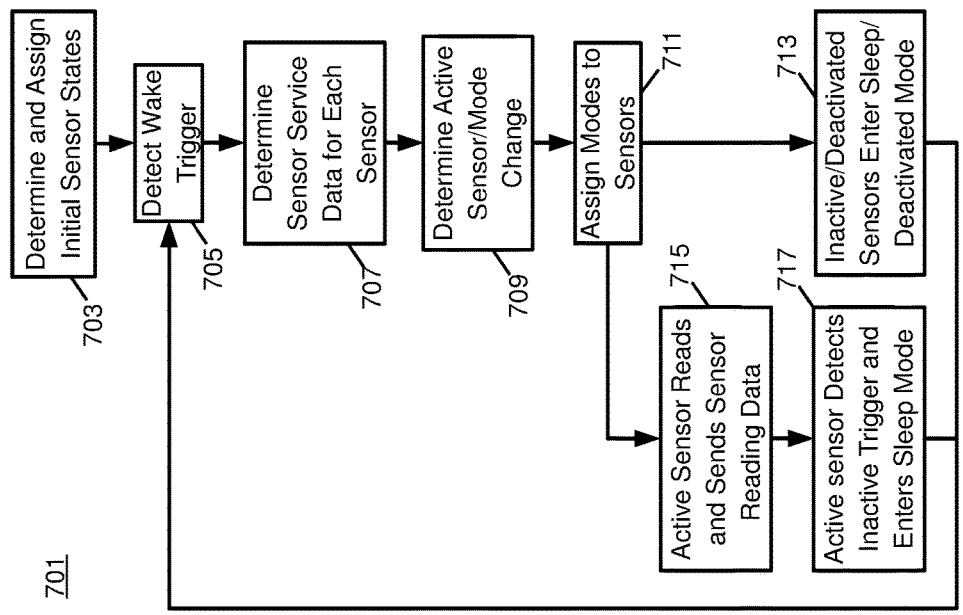
FIG. 7 is a flow diagram illustrating a method of operating a sensor system according to some embodiments.

FIG. 7 is a flow diagram illustrating a method 701 of operating a sensor system according to some embodiments. In block 703, initial sensor states may be determined and assigned. In some embodiments, the initial sensor states are modes that are assigned to each sensor prior to operation or evaluation of the sensor operating states. For example, the initial sensor states may be set prior to the sensors being installed, with the sensor states stored in memory of the sensors. Alternatively, the initial sensor states may be assigned by a sensor management element or by arbitration or determination by the sensors themselves, either prior to a first wake trigger, or in response to the first wake trigger. In block 705 the sensors detect a first wake trigger and wake up. In block 707, each of the sensors, if operational, determine sensor service data. In block 709, the system determines the active sensor, and whether any modes changes are needed. In some embodiments, each of the sensors may transmit its own sensor service data to each other sensor, and receive the sensor service data from each other sensor. Based on the other sensor service data and local sensor service data, a sensor may determine whether an active sensor already exists, whether the existing active sensor will remain the active sensor based on the sensor service data for the currently active sensor, and whether the current sensor should become the new active sensor. In other embodiments, the sensor management element may acquire sensor service data for all sensors in the system, and may use the sensor service data to make the determination on whether there is a current active sensor, whether the active sensor needs to be assigned or reassigned, and whether any other mode change is needed. In block 711, the modes are assigned to each of the sensors. In embodiments where the sensors themselves determine the active sensor, each sensor may determine and assign its own mode. In embodiments where the sensor management element determines the modes, the sensor management element may send messages regarding mode assignment to each sensor in the system. In block 713, sensors that are assigned to be inactive or deactivated enter a sleep mode or a deactivated mode. In block 715, the sensor that was assigned to be the active sensor reads sensor reading data, and wirelessly transmits the sensor reading data to the sensor data server. The active sensor continues to read and send the sensor reading data until the active sensor detects an inactive trigger and enters sleep mode. The active and inactive sensors remain in sleep mode until a subsequent wake trigger is detected in block 707, and the process is repeated.

Figure 8:
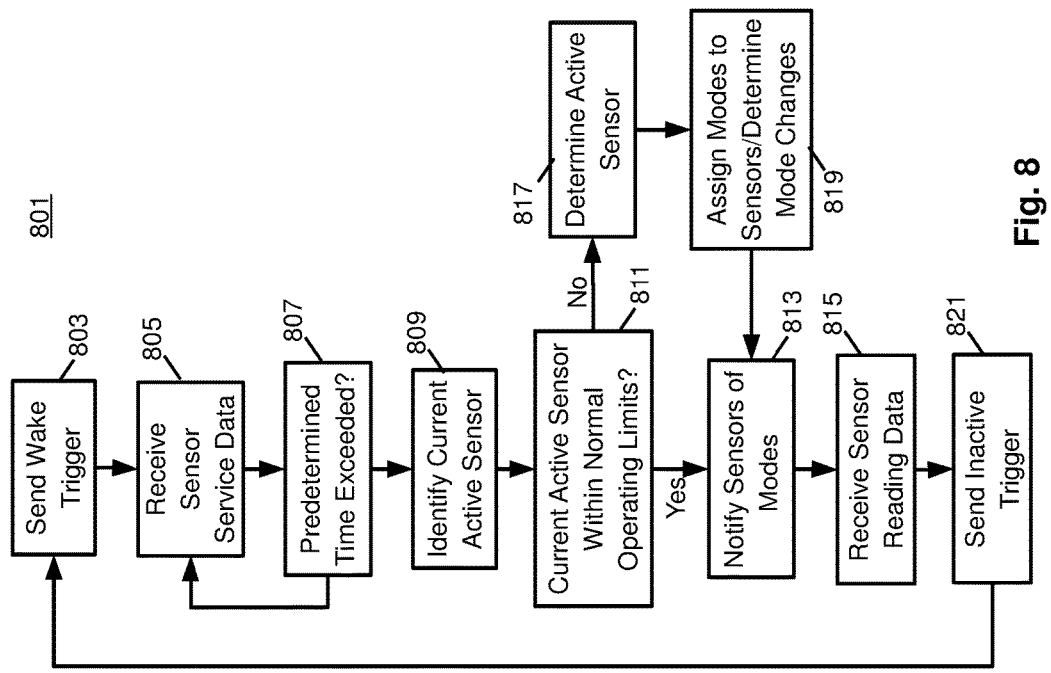
FIG. 8 is a flow diagram illustrating a method of operating a sensor management element according to some embodiments.

FIG. 8 is a flow diagram illustrating a method 801 of operating a sensor management element according to some embodiments. In block 803, the sensor management element may send a wake trigger to sensors in the system associated with the sensor management element. In other embodiments, the sensor management element may omit sending the wake trigger, and the sensors may respond to a wake trigger detected as a result of operation of the component being monitored, a timer, or the like. In block 805, the sensor management element receives sensor service data from the sensors. The sensor management element may continue to wait for sensor service data form the sensors until sensor service data is received from all sensors in the system that are not already known to be deactivated, or until a predetermined time is met or exceeded in block 807.

When the sensor management element is done collecting sensor service data, the sensor management element identifies a current active sensor in block 809, if a current active sensor exists and has sent sensor service data. In block 811, the sensor management element determines, according to the sensor service data associated with the current active sensor, whether the current active sensor is operating within normal operating limits. For example, the sensor management element may determine whether the current active sensor has a battery charge that exceeds a predetermined threshold, indicating that the sensor has a battery charge sufficient to perform monitoring. Additionally, the sensor management element may determine, from the sensor service data, whether the current active sensor is operating properly, for example, that the sensor has not experienced operating failures such as sensor values being out of range, open circuit or short circuits in sensor circuitry or wiring, or data quality being out of an acceptable range.

If the sensor management element determines that the current active sensor is operating within normal operating limits, in block 813, the sensor management element may notify the sensors of their assigned modes, and may maintain the current active sensor as the active sensor. Thus, the sensor management element may verify each sensors mode to cause the sensors to enter a sleep or active state in a timely manner. If the sensor management element determines that the current active sensor is not operating within normal operating limits, in block 817, the sensor management element determines the active sensor according to the sensor service data from sensors that are operating within normal operating limits. The sensor management element may also determine whether any other sensors need to have a mode changed, and in block 819, may assign modes to each of the sensors. For example, the sensor management element may determine that a previously inactive sensor should be a new active sensor, and the previously active sensor may be deactivated. The sensor management element may notify the sensors of their respective modes in block 813.

After the sensor are notified of their modes, the sensor management element may, in block 815, then receive sensor reading data from the active sensor. The sensor management element continues to receive sensor reading data until the active sensor enters a sleep mode or is deactivated. In some embodiments where the sensor management element controls the wake trigger, the sensor management element may, in block 821, send an inactive trigger to cause the active sensor to enter a sleep mode. The process may then repeat.

Figure 9:
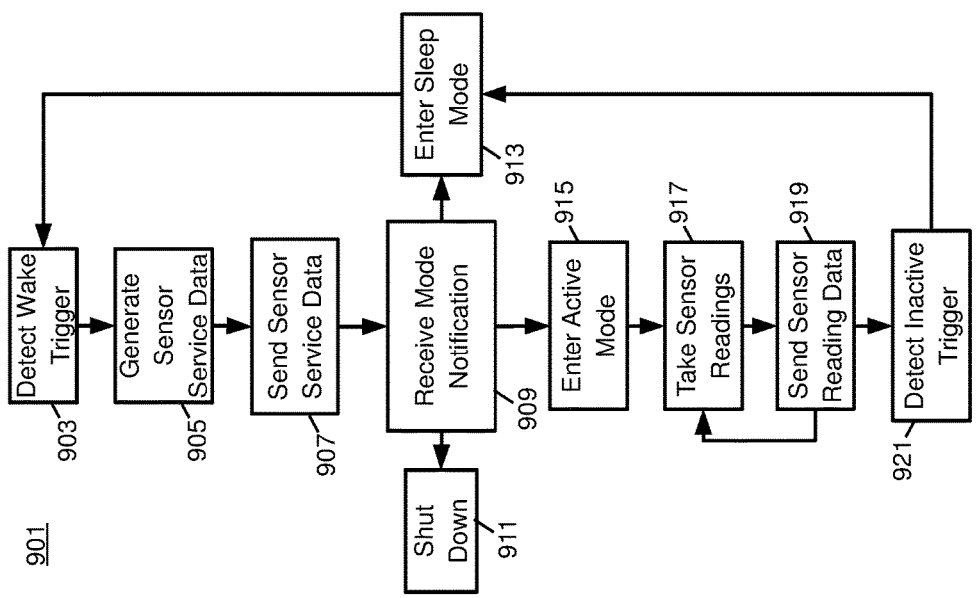
FIG. 9 is a flow diagram illustrating a method of operating a sensor in a sensor system managed by a sensor management element according to some embodiments.

FIG. 9 is a flow diagram illustrating a method 901 of operating a sensor in a sensor system managed by a sensor management element according to some embodiments. In block 903, the sensor detects a wake trigger. The wake trigger may be a message sent from the sensor management element, a physical trigger such as vibration of the monitored component, a timer expiring, or the like. In block 905, the sensor generates sensor service data, and in block 907, the sensor sends the sensor service data to the sensor management element. The sensor service data may include configuration information, sensor identification data, power data, sensor state data, environmental data, operational data, or the like, and may be used by the sensor management element to determine whether sensor is operating within normal operating limits.

In block 909, the sensor receives a mode notification message from the sensor management element. The mode notification message may include information identifying the mode the sensor is assigned, whether a mode change needs to be performed, or the like. The sensor determines which mode it will enter, and if the mode is the deactivated mode, the sensor shuts down in block 911. If the assigned mode is an inactive mode, the sensor enters sleep mode in block 913, and waits for a subsequent wake trigger to repeat the process.

If the assigned mode is the active mode, the sensor is assigned to be the active sensor, and the sensor enters the active mode in block 915. The sensor then takes sensor readings in block 917, and in block 919 sends associated sensor reading data to a sensor data server. The sensor may continue taking sensor readings and sending the sensor reading data until an inactive trigger is detected in block 21. When the inactive trigger is detected, the sensor enters sleep mode in block 913, and waits for a subsequent wake trigger to repeat the process. In some embodiments, the inactive trigger may be a message from the sensor management element, or in other embodiments, may be a period or no vibration or movement of the monitored component, expiration of a timer, or the like.

Figure 10:
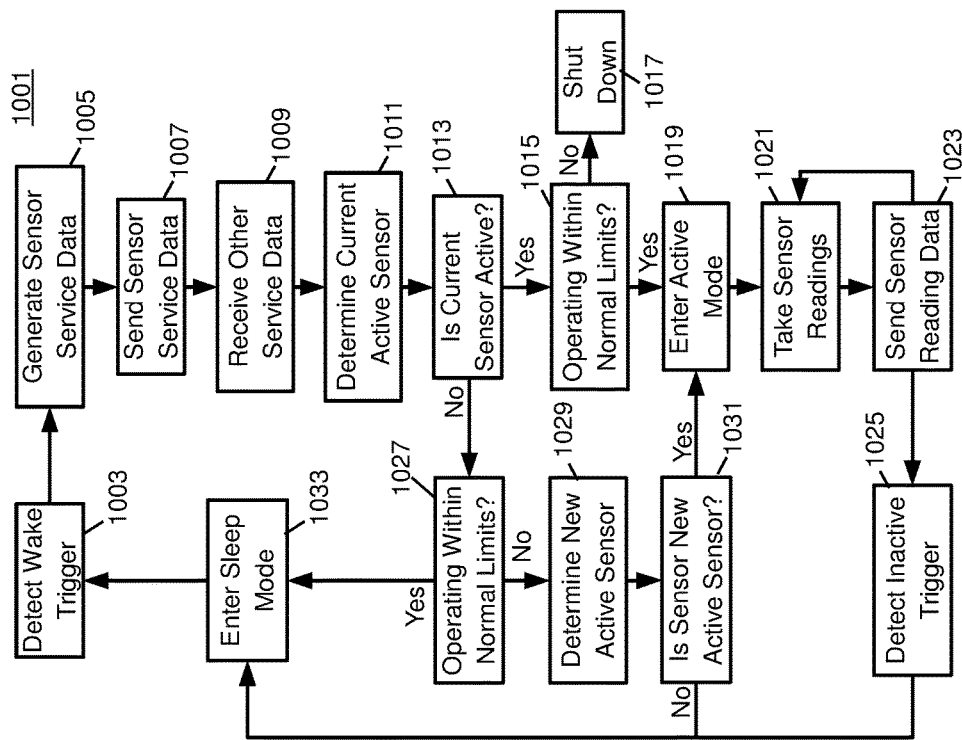
FIG. 10 is a flow diagram illustrating a method of operating a sensor in a sensor system managed using sensor based sensor switching according to some embodiments.

FIG. 10 is a flow diagram illustrating a method tool of operating a sensor in a sensor system managed using sensor based sensor switching according to some embodiments.

In block 1003, the sensor detects a wake trigger. The wake trigger may be a message sent from the sensor management element, a physical trigger such as vibration of the monitored component, a timer expiring, or the like. In block 1005, the sensors generate sensor service data and send the sensor service data to each other sensor in the system in block 1007.

In block 1009, the sensor receives sensor service data form each of the other sensors. In block 1011, the sensor determines which sensor in the sensor system is the current active sensor. The sensor may determine the mode assignment or which sensor is the active sensor from the sensor service data of the sensor, which may include the current mode in sensor state data of the sensor service data. In block 1013, the sensor determines whether the sensor is the current active sensor.

If the sensor is the current active sensor, in block 1015, the sensor may determine whether it is operating within normal limits. If the sensor is not operating within normal limits, the sensor may shut down in block 1017, as the sensor may determine that, for example, the sensor has depleted its useful battery charge or otherwise become inoperable, and the sensor may shut down and allow the remaining sensors in the system to select a new active sensor. If the sensor is operating within normal limits, the sensor may assume that it remains the active sensor, and may enter active mode in block 1019. Once the sensor enters active mode, the sensor take sensor readings in block 1021 and send the sensor reading data to a sensor data server in block 1023. The sensor may repeat the collection and sending of sensor readings until an inactive trigger is detected in block 1025, after which the sensor may enter sleep mode in block 1033 and repeat the process.

If the sensor determines that it is not the current active sensor in block 1013, then the sensor may attempt to determine whether another sensor is the active server, or whether a new active server is assigned. In block 1027, the sensor may determine whether the active sensor, which is another sensor in the sensor system, is operating within normal limits. If the active sensor is operating normally, then the sensor, which is not currently the active sensor, assumes that the currently active sensor should continue as the active sensor, and the sensor may enter sleep mode in block 1033.

If the current active sensor is not operating within normal operating limits, the sensor determined a new active sensor in block 1029. The new active sensor may be selected according to one or more rules or selection criteria using the battery charge of each of the reaming sensors in the system, the sensor service data of the remaining sensors, or the like. In block 1031, the sensor determines whether it should itself be the new active sensor. If the sensor is the new active sensor, the sensor may enter active mode in block 1019, take sensor readings in block 1021, and send the sensor reading data to the sensor data server in block 1023 as described above. If the sensor determines, in block 1031 that it is not the new active sensor, the sensor may assume that another sensor has become the active sensor, and may enter sleep mode in block 1033 and repeat the process.

An embodiment method for operating a sensor system includes detecting a first wake trigger by a plurality of sensors associated with a component disposed in a remote location, generating, by each sensor of the plurality of sensors, sensor service data that includes a battery charge level of a respective sensor of the plurality of sensors, determining an active sensor according to the sensor service data of each sensor of the plurality of sensors, and assigning the active sensor to enter an active mode assigning each sensor of the plurality of sensors, other than the active sensor, to enter a sleep mode, generating, by the active sensor, sensor reading data indicating a physical parameter of the component until an inactive trigger is detected by the active sensor, sending the sensor reading data by the active sensor using a wireless transmission to a sensor data server, and leaving the active mode by the active sensor and entering a sleep mode by the active sensor after the active sensor sends the sensor reading data and in response to the active sensor detecting an inactive trigger.

In some embodiments, determining the active sensor includes determining, by a sensor of the plurality of sensors, that the sensor is the active sensor. In some embodiments, the method further includes sending, by each sensor of the plurality of sensors, the respective sensor service data to each other sensor of the plurality of sensors, and determining, by the sensor of the plurality of sensors, that the sensor is the active sensor includes determining, by the sensor of the plurality of sensors and according to the sensor service data of the sensor and sensor service data received from other sensors of the plurality of sensors, that the sensor is the active sensor. In some embodiments, determining, by the sensor, that the sensor is the active sensor includes determining that the sensor is the active sensor in response to determining that the sensor was previously the active sensor and further in response to the sensor service data of the sensor indicating that the battery charge level of the sensor exceeds a predetermined charge threshold and further indicating that the sensor, while the sensor was previously the active sensor, operated free of operating failures. In some embodiments, determining the active sensor includes determining, by a sensor management element of the sensor system, that a sensor of the plurality of sensors is the active sensor. In some embodiments, the method further includes sending, by each sensor of the plurality of sensors, the respective sensor service data to the sensor management element, and sending, by the sensor management element to the sensor, a mode assignment message indicating that the sensor is assigned to enter the active mode, where the determining, by the sensor of the plurality of sensors, that the sensor is the active sensor includes determining, by the sensor, according to the mode assignment message, that the sensor is the active sensor. In some embodiments, each sensor of the plurality of sensors has a battery charge run time that is less than a service interval of the component, and a battery charge lifetime of the sensor system extends past the service interval of the associated component, where the battery charge lifetime of the sensor system is the battery charge run time of each sensor of the plurality of sensors when used in sequence.

An embodiment sensor device includes a transducer, a wireless interface circuit, a battery, and a controller connected to the battery, the transducer and the wireless interface circuit. The controller is configured to detect a wake trigger, generate sensor service data, where the sensor service data includes a battery charge level of the battery, transmit the sensor service data through the wireless interface circuit, determine whether the sensor device should be an active sensor in a plurality of sensor devices according to at least the sensor service data, enter an active mode in response to determining that the sensor device should be the active sensor, enter a sleep mode in response to determines that the sensor device should not be the active sensor, generate, while the sensor device is in the active mode, sensor reading data according to a reading from the transducer and until an inactive trigger is detected by the sensor, send the sensor reading data by the active sensor using a wireless transmission to a sensor data server, and leave the active mode and entering a sleep mode in response to the active sensor detecting an inactive trigger.

In some embodiment the controller is configured to transmit the sensor service data through the wireless interface circuit to each other sensor device of the plurality of sensor devices, where the controller is further configured to receive, from each sensor of the plurality of sensor devices, other than the sensor device, other sensor service data associated with the respective sensor, and determine that the sensor device should be the active sensor according to the sensor service data of the sensor device and the other sensor service data received from other sensor devices of the plurality of sensor devices. In some embodiments, the wake trigger is a physical component trigger that is one of movement of the component being monitored by the sensor device, or vibration of the component after a predetermined period without vibration. In some embodiments, the controller is configured to determine that the sensor device should be the active sensor in response to determining that the sensor device was previously the active sensor and further in response to the sensor service data of the sensor device indicating that the battery charge level of the sensor device exceeds a predetermined charge threshold and further indicating that the sensor device operated free of operating failures while the sensor device was previously the active sensor. In some embodiments, the controller is configured to transmit the sensor service data through the wireless interface circuit to a sensor management element, and the controller is configured to receive, from the sensor management element, a mode assignment message indicating a mode assigned for the sensor device is assigned to enter the active mode, enter the active mode in response to the mode assignment message indicating that the sensor device should be the active mode, and enter a sleep mode in response to the mode assignment message indicating that the sensor device should not be the active sensor. In some embodiments, the wake trigger is a first signal from the sensor management element, and the inactive trigger is a second signal from the sensor management element.

An embodiment system includes a rotating component, and a sensor system having a plurality of sensors. Each sensor of the plurality of sensors is disposed on the component and monitors the component and is configured to detect a first wake trigger generating sensor service data that includes a battery charge level of a respective sensor of the plurality of sensors, determine an assigned mode for the respective sensor, where the assigned mode is assigned according to the sensor server data of each sensor of the plurality of sensors, where the assigned mode is one of at least an active mode or a sleep mode, and where at least one sensor of the plurality of sensors is determined to be an active sensor and is assigned an active mode, enter the active mode in response to the respective sensor determining that the respective sensor is the active sensor and is assigned the active mode, generate, in response to the respective sensor being the active sensor, sensor reading data indicating a physical parameter of the component until an inactive trigger is detected by the active sensor, send the sensor reading data by the active sensor using a wireless transmission, leave the active mode in response to the respective sensor being in the active mode and enter the sleep mode after the respective sensor sends the sensor reading data and in response to the respective sensor detecting the inactive trigger, and enter the sleep mode response to the respective sensor determining that the respective sensor is assigned the sleep mode.

In some embodiments, each respective sensor of the plurality of sensors is configured to send the respective sensor service data to each other sensor of the plurality of sensors, and determine the assigned mode for the respective sensor by determining, according to the sensor service data of the respective sensor and sensor service data received from other sensors of the plurality of sensors. In some embodiments, each respective sensor of the plurality of sensors is configured to determine that the assigned mode for the respective sensor is the active mode and that the respective sensor is the active sensor in response to determining that the respective sensor was previously the active sensor and further in response to the sensor service data of the respective sensor indicating that the battery charge level of the respective sensor exceeds a predetermined charge threshold and further indicating that the respective sensor, while the respective sensor was previously the active sensor, operated free of operating failures. In some embodiments, the system further includes a sensor management element configured to assign the assigned mode for each sensor of the plurality of sensors, and send a mode assignment message to each sensor of the plurality of sensors, where the mode assignment message indicates the assigned mode for the respective sensor, and where each respective sensor of the plurality of sensors is configured to determine the assigned mode according to the respective mode assignment message. In some embodiments, the sensor service data further includes sensor state data of the respective sensor, where each respective sensor of the plurality of sensors is configured to send the respective sensor service data to the sensor management element, and where the sensor management element is further configured to assign the assigned mode for each sensor of the plurality of sensors according to a battery charge state and sensor state data of the respective sensor. In some embodiments, the sensor management element is further configured to send the wake trigger as a first signal to each sensor of the plurality of sensors, and send the inactive trigger as a second signal to each sensor of the plurality of sensors. In some embodiments, each sensor of the plurality of sensors has a battery charge run time that is less than a service interval of the component, and a battery charge lifetime of the sensor system extends past the service interval of the component, where the battery charge lifetime of the sensor system is the battery charge run time of each sensor of the plurality of sensors when used in sequence.

Embodiments may achieve advantages. The use of the sensors on the moving features of mechanical equipment (such as e.g., the planetary gear set of the gearbox) may allow the mechanical systems to be more accurately monitored, and may allow failures to be detected earlier. Because rebuilding remote systems such as sealed or otherwise inaccessible systems is a costly maintenance procedure, disassembling the relevant system to replace sensors or charge the batteries of the sensors may be undesirable. Sequential use of redundant sensors permits wireless monitoring of mechanical systems for time periods longer than could be achieved by a single sensor.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a sensor system, comprising:
    detecting a first wake trigger by a plurality of sensors associated with a component disposed in a remote location;
    generating, by each sensor of the plurality of sensors, sensor service data that comprises a battery charge level of a respective sensor of the plurality of sensors;
    determining an active sensor according to the sensor service data of each sensor of the plurality of sensors, and assigning the active sensor to enter an active mode;
    assigning each sensor of the plurality of sensors, other than the active sensor, to enter a sleep mode;
    generating, by the active sensor, sensor reading data indicating a physical parameter of the component until an inactive trigger is detected by the active sensor;
    sending the sensor reading data by the active sensor using a wireless transmission to a sensor data server; and
    leaving the active mode by the active sensor and entering a sleep mode by the active sensor after the active sensor sends the sensor reading data and in response to the active sensor detecting an inactive trigger.

2. The method of claim 1, wherein the determining the active sensor comprises determining, by a sensor of the plurality of sensors, that the sensor is the active sensor.

3. The method of claim 2, wherein the method further comprises sending, by each sensor of the plurality of sensors, the respective sensor service data to each other sensor of the plurality of sensors; and
    wherein the determining, by the sensor of the plurality of sensors, that the sensor is the active sensor comprises determining, by the sensor of the plurality of sensors and according to the sensor service data of the sensor and sensor service data received from other sensors of the plurality of sensors, that the sensor is the active sensor.

4. The method of claim 2, wherein the determining, by the sensor, that the sensor is the active sensor comprises:
    determining that the sensor is the active sensor in response to determining that the sensor was previously the active sensor and further in response to the sensor service data of the sensor indicating that the battery charge level of the sensor exceeds a predetermined charge threshold and further indicating that the sensor, while the sensor was previously the active sensor, operated free of operating failures.

5. The method of claim 1, wherein the determining the active sensor comprises determining, by a sensor management element of the sensor system, that a sensor of the plurality of sensors is the active sensor.

6. The method of claim 5, wherein the method further comprises:
    sending, by each sensor of the plurality of sensors, the respective sensor service data to the sensor management element; and
    sending, by the sensor management element to the sensor, a mode assignment message indicating that the sensor is assigned to enter the active mode;
    wherein the determining, by the sensor of the plurality of sensors, that the sensor is the active sensor comprises determining, by the sensor, according to the mode assignment message, that the sensor is the active sensor.

7. The method of claim 1, wherein each sensor of the plurality of sensors has a battery charge run time that is less than a service interval of the component, and wherein a battery charge lifetime of the sensor system extends past the service interval of the associated component, wherein the battery charge lifetime of the sensor system is the battery charge run time of each sensor of the plurality of sensors when used in sequence.

8. A sensor device, comprising:
    a transducer;
    a wireless interface circuit;
    a battery; and a controller connected to the battery, the transducer and the wireless interface circuit, wherein the controller is configured to:
  detect a wake trigger, wherein the wake trigger is at least one of a physical trigger detected by the controller, a message received through the wireless interface circuit from a sensor management element, or a timer expiring;
  generate sensor service data, wherein the sensor service data comprises a battery charge level of the battery;
  transmit the sensor service data through the wireless interface circuit;
  determine whether the sensor device should be an active sensor in a plurality of sensor devices according to at least the sensor service data;
  enter an active mode in response to determining that the sensor device should be the active sensor;
  enter a sleep mode in response to determines that the sensor device should not be the active sensor;
  generate, while the sensor device is in the active mode, sensor reading data according to a reading from the transducer and until an inactive trigger is detected by the sensor;
  send the sensor reading data by the active sensor using a wireless transmission to a sensor data server; and
  leave the active mode and entering a sleep mode in response to the active sensor detecting an inactive trigger.

9. The sensor device of claim 8, wherein the controller is configured to transmit the sensor service data through the wireless interface circuit to each other sensor device of the plurality of sensor devices;
  wherein the controller is further configured to:
    receive, from each sensor of the plurality of sensor devices, other than the sensor device, other sensor service data associated with the respective sensor; and
    determine that the sensor device should be the active sensor according to the sensor service data of the sensor device and the other sensor service data received from other sensor devices of the plurality of sensor devices.

10. The sensor device of claim 8, wherein the wake trigger is the physical trigger, and is one of movement of the component being monitored by the sensor device, or vibration of the component after a predetermined period without vibration.

11. The sensor device of claim 8, wherein the controller is configured to determine that the sensor device should be the active sensor in response to determining that the sensor device was previously the active sensor and further in response to the sensor service data of the sensor device indicating that the battery charge level of the sensor device exceeds a predetermined charge threshold and further indicating that the sensor device operated free of operating failures while the sensor device was previously the active sensor.

12. The sensor device of claim 8, wherein the controller is configured to transmit the sensor service data through the wireless interface circuit to a sensor management element; and
  wherein the controller is configured to:
    receive, from the sensor management element, a mode assignment message indicating a mode assigned for the sensor device is assigned to enter the active mode;
    enter the active mode in response to the mode assignment message indicating that the sensor device should be the active mode; and
    enter a sleep mode in response to the mode assignment message indicating that the sensor device should not be the active sensor.

13. The sensor device of claim 12, wherein the wake trigger is a first signal from the sensor management element, and wherein the inactive trigger is a second signal from the sensor management element.

14. A system, comprising:
  a rotating component; and
  a sensor system having a plurality of sensors, wherein each sensor of the plurality of sensors is disposed on the component and monitors the component;
  wherein each respective sensor of the plurality of sensors is configured to:
    detect a wake trigger, wherein the wake trigger is at least one of a physical trigger detected by the respective sensor, a message received by the respective sensor from a sensor management element, or a timer expiring;
    generating sensor service data that comprises a battery charge level of a respective sensor of the plurality of sensors;
    determine an assigned mode for the respective sensor, wherein the assigned mode is assigned according to the sensor server data of each sensor of the plurality of sensors, wherein the assigned mode is one of at least an active mode or a sleep mode, and wherein at least one sensor of the plurality of sensors is determined to be an active sensor and is assigned an active mode;
    enter the active mode in response to the respective sensor determining that the respective sensor is the active sensor and is assigned the active mode;
    generate, in response to the respective sensor being the active sensor, sensor reading data indicating a physical parameter of the component until an inactive trigger is detected by the active sensor;
    send the sensor reading data by the active sensor using a wireless transmission;
    leave the active mode in response to the respective sensor being in the active mode and enter the sleep mode after the respective sensor sends the sensor reading data and in response to the respective sensor detecting the inactive trigger; and
    enter the sleep mode response to the respective sensor determining that the respective sensor is assigned the sleep mode.

15. The system of claim 14, wherein each respective sensor of the plurality of sensors is configured to:
  send the respective sensor service data to each other sensor of the plurality of sensors; and
  determine the assigned mode for the respective sensor by determining, according to the sensor service data of the respective sensor and sensor service data received from other sensors of the plurality of sensors.

16. The system of claim 15, wherein each respective sensor of the plurality of sensors is configured to determine that the assigned mode for the respective sensor is the active mode and that the respective sensor is the active sensor in response to determining that the respective sensor was previously the active sensor and further in response to the sensor service data of the respective sensor indicating that the battery charge level of the respective sensor exceeds a predetermined charge threshold and further indicating that the respective sensor, while the respective sensor was previously the active sensor, operated free of operating failures.

17. The system of claim 15, further comprising the sensor management element configured to assign the assigned mode for each sensor of the plurality of sensors, and send a mode assignment message to each sensor of the plurality of sensors, wherein the mode assignment message indicates the assigned mode for the respective sensor; and wherein each respective sensor of the plurality of sensors is configured to determine the assigned mode according to the respective mode assignment message.

18. The system of claim 17, wherein the sensor service data further comprises sensor state data of the respective sensor, and wherein each respective sensor of the plurality of sensors is configured to send the respective sensor service data to the sensor management element; and wherein the sensor management element is further configured to assign the assigned mode for each sensor of the plurality of sensors according to a battery charge state and sensor state data of the respective sensor.

19. The system of claim 17, wherein the sensor management element is further configured to:

send the wake trigger as a first signal to each sensor of the plurality of sensors; and send the inactive trigger as a second signal to each sensor of the plurality of sensors.

20. The system of claim 15, wherein each sensor of the plurality of sensors has a battery charge run time that is less than a service interval of the component, and wherein a battery charge lifetime of the sensor system extends past the service interval of the component, wherein the battery charge lifetime of the sensor system is the battery charge run time of each sensor of the plurality of sensors when used in sequence.

* * * * *